Oct. 21, 1969   F. C. CALDWELL   3,473,302
TRACTOR DRAWN MULTIPLE SECTION FOLDABLE MOWER
Filed April 14, 1967   3 Sheets-Sheet 2
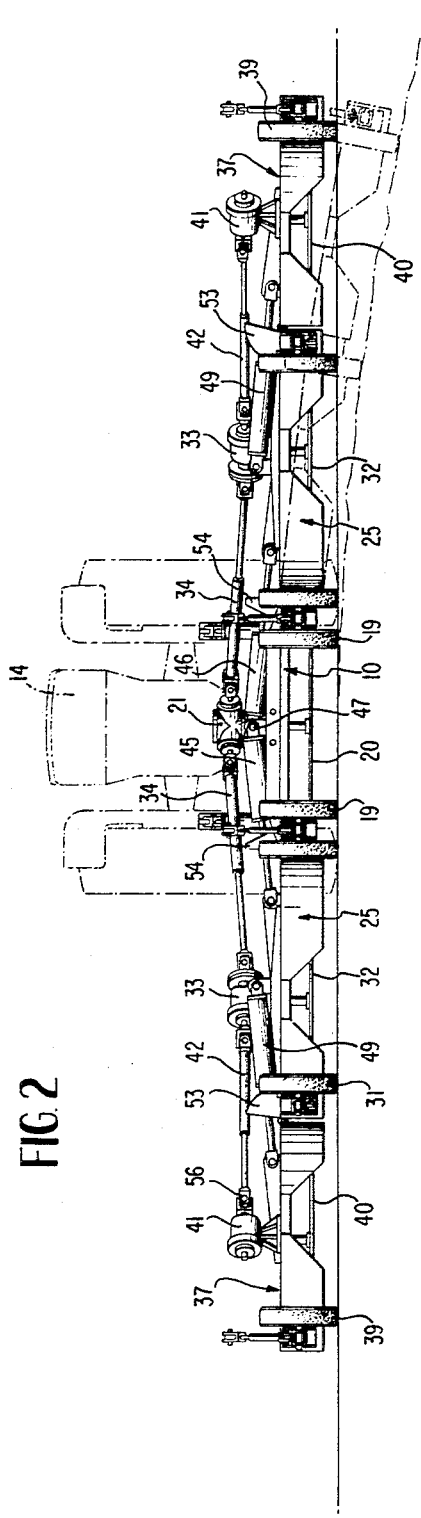
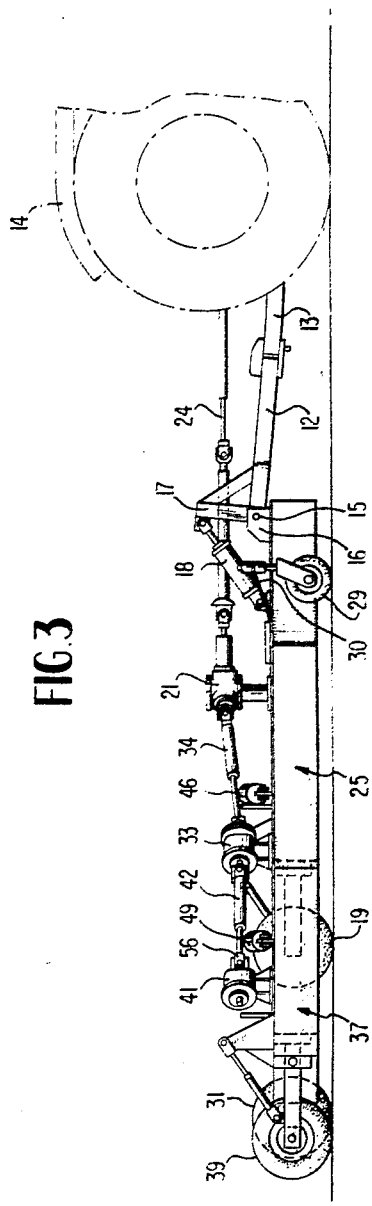
INVENTOR
FREDERICK CLAY CALDWELL
BY
ATTORNEY Oct. 21, 1969  F. C. CALDWELL  3,473,302
TRACTOR DRAWN MULTIPLE SECTION FOLDABLE MOWER
Filed April 14, 1967  3 Sheets-Sheet 3

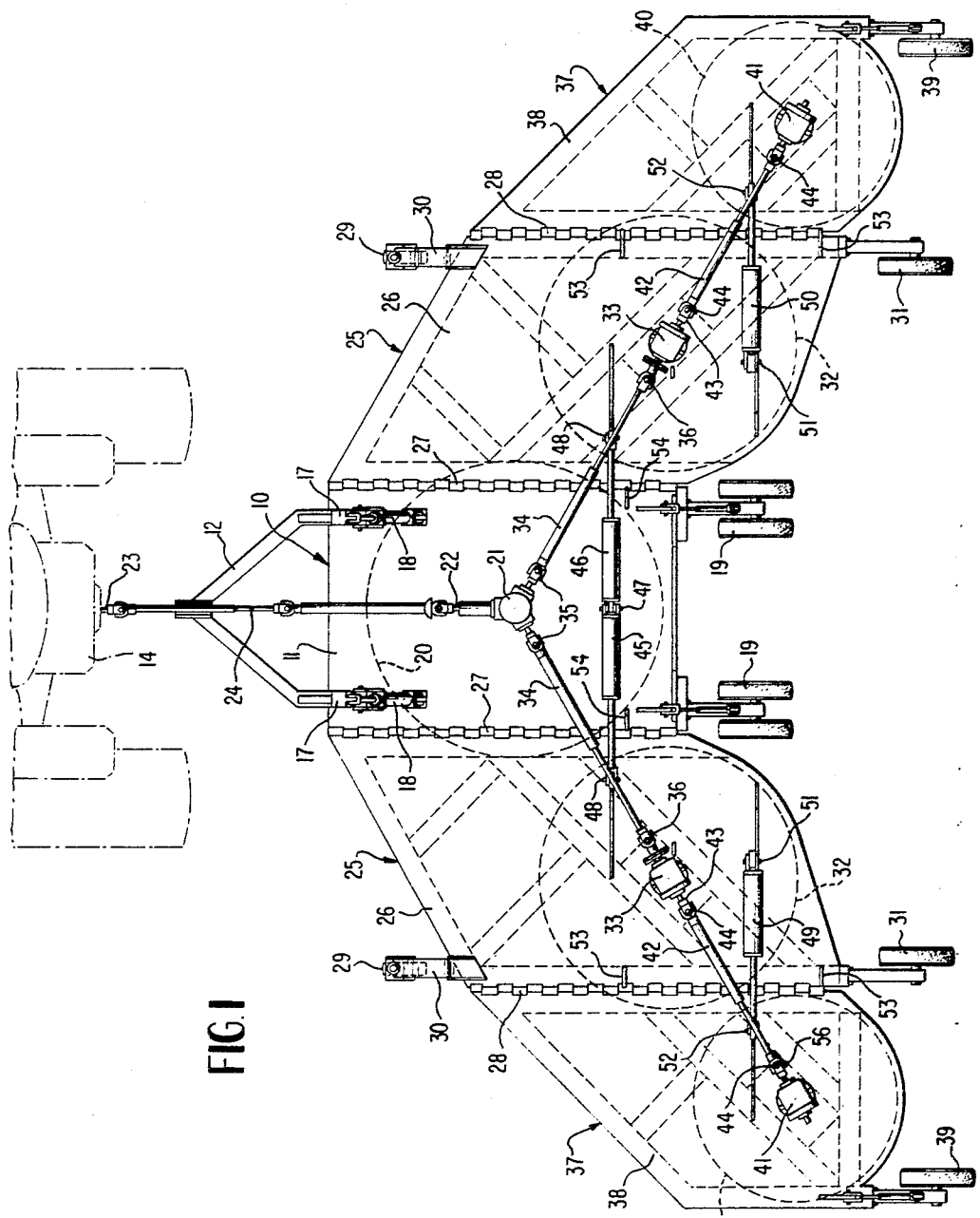

INVENTOR
FREDERICK CLAY CALDWELL

BY *B. P. Fishburn, Jr.*

ATTORNEY

United States Patent Office 3,473,302
Patented Oct. 21, 1969

3,473,302
TRACTOR DRAWN MULTIPLE SECTION
FOLDABLE MOWER
Frederick Clay Caldwell, Corpus Christi, Tex., assignor to E. L. Caldwell, Inc., Corpus Christi, Tex., a corporation of Texas
Continuation-in-part of application Ser. No. 458,988, May 26, 1965. This application Apr. 14, 1967, Ser. No. 630,872
The portion of the term of the patent subsequent to Sept. 10, 1985, has been disclaimed
Int. Cl. A01d 75/30
U.S. Cl. 56—6                               4 Claims

ABSTRACT OF THE DISCLOSURE

A plural section tractor drawing mowing machine including power means operable from the tractor seat enabling the machine to be folded for passage through a farm gate and to be repositioned or unfolded for mowing a wide swatch.

CROSS-REFERENCE TO RELATED APPLICATION

This application is a continuation-in-part of prior copending application Ser. No. 458,988, filed May 26, 1965 and now Patent No. 3,400,521, for Tractor-drawn Mowing Machine.

BACKGROUND OF THE INVENTION

The invention has come about as a result of the need for a very wide mowing machine capable of cutting a swath up to about thirty feet wide with the machine having the capability of traveling along a road or highway and passing through relatively narrow gateways and the like. Such a machine necessarily must be foldable and should also be capable of following the natural contours of the ground during the mowing operation.

Plural section foldable mowers are known in the prior art, broadly speaking, but these known machines suffer from certain disadvantages and have proven to be very awkward to use and therefore not entirely practical. For example, the prior art machines which comprise more than three mower sections must either be folded manually or with the aid of some mechanism which cannot be operated remotely from the tractor driver's seat. Additionally, some of the prior art machines employ cutter blades which intermesh during operation and must therefore be timed. Also, when folded, some of the prior art machines are still excessively wide and/or excessive in height so that they cannot traverse narrow passageways or pass under certain obstructions and do not meet highway regulations. These and other disadvantages are fully overcome by the present invention.

SUMMARY OF THE INVENTION

The invention mower comprises a central section and a pair of wing sections on each side thereof, all sections being hingedly connected. Front caster wheels for the mower are provided near the outboard hinges to prevent sagging and to allow the machine to follow the contours of the ground. Trailing adjustable wheel units are also provided on the mower. The front of the central mower section has a draft tongue which may be raised and lowered by power means. The cutters of the several units are positioned to cut a wide continuous swath without intermeshing and therefore requiring no timing of the cutters. There is a central gear box on the central mower unit and a gear box on each outboard unit. The several gear boxes are interconnected by telescoping universal joint equipped drive shafts which lie close to the top of the mower housing. The main central gear box is powered through a drive shaft connected to the power take-off of the tractor. Transversely disposed hydraulic power cylinder units under control of the tractor driver are utilized for the folding and unfolding operation, which may be accomplished with ease after disconnecting only a single universal joint at each side of the machine through a quick disconnect yoke. The folding and unfolding cylinders lie close to the top of the mower housing and render the structure highly compact and uncluttered.

BRIEF DESCRIPTION OF THE DRAWINGS

FIGURE 1 is a plan view of a multiple section mowing machine embodying the invention;

FIGURE 2 is a rear elevation of the machine in the unfolded or mowing position;

FIGURE 3 is a side elevation of the machine; and

DESCRIPTION OF THE PREFERRED EMBODIMENT

Figure 4:
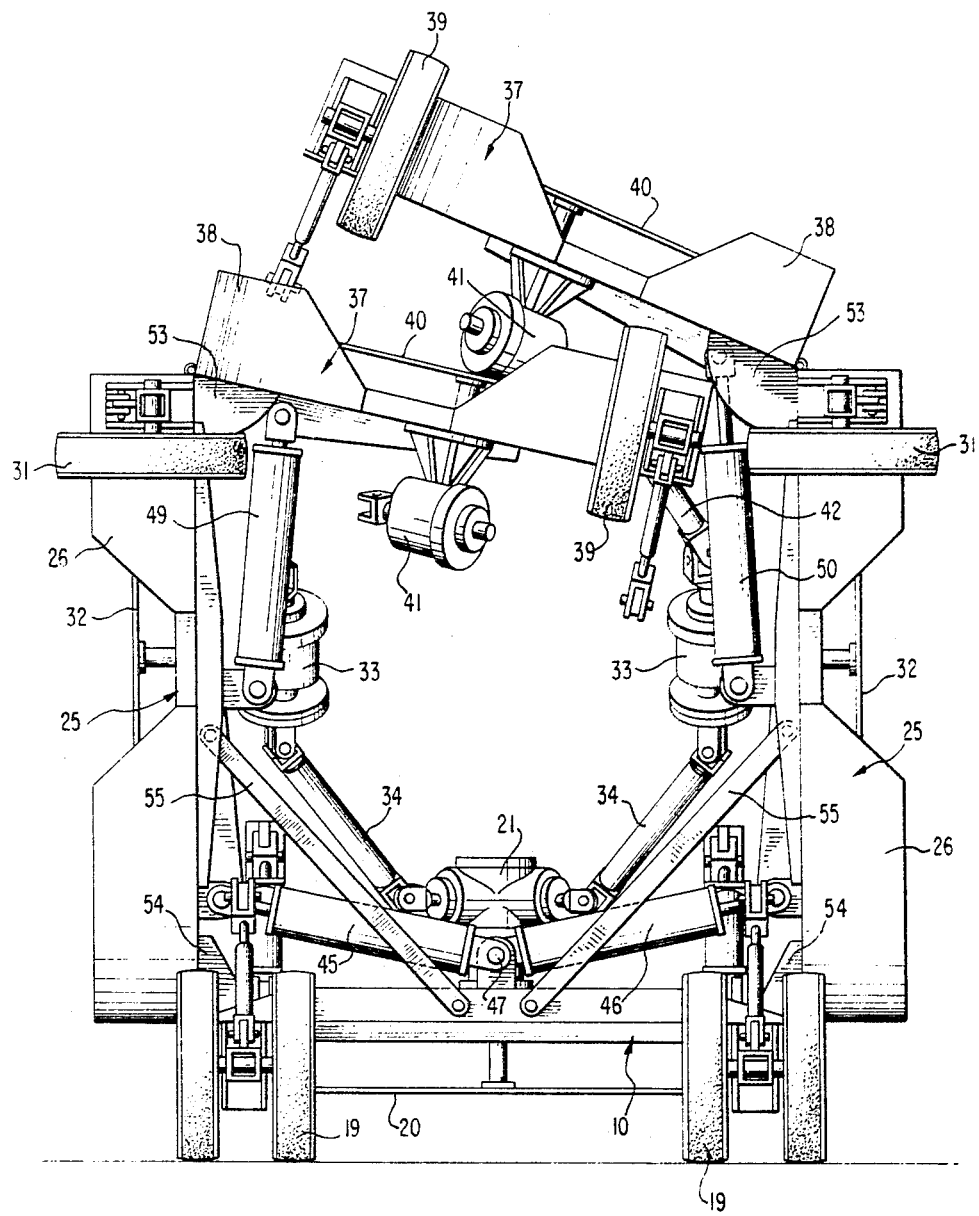
FIGURE 4 is a rear elevational view of the machine in the completely folded condition.

Referring to the drawings wherein like numerals designate like parts, the numeral 10 designates generally a central mower section or unit having a rectangular guard or housing 11 formed of heavy sheet metal and equipped at its forward end with a sturdy draft tongue 12 adapted to be coupled with the drawbar 13 of a farm tractor 14.

The forward end of the mower section 10 is bodily supported by the tongue 12 and the latter has its arms pivoted at 15 to bracket means 16 on the housing 11. At its opposite sides, the tongue 12 has rigid upright extensions 17, connected with inclined extensible and retractable hydraulic cylinder-piston units 18 under control of the tractor driver on the tractor seat through conventional valve means. By manipulating the cylinder-piston units 18, the extensions 17 and tongue 12 are swung on pivots 15 to raise and lower the tongue and thereby adjust the height of the front end of the central mower section 10. The rear end of the central section 10 has adjustable trailing wheel units or dollies 19 connected therewith to support the rear end, as shown in the drawings.

The central unit 10 has a relatively large vertical axis rotary cutter blade 20 driven from above the housing 11 by a conventional central main gear box or transmission 21 which may contain bevel gearing or the like. The front longitudinal input shaft 22 of central gear box 21 is driven by the rotary power take-off shaft 23 of the tractor through suitable adjustable shafting 24 containing the necessary universal joints, as indicated. The drive shafting 24 is generally horizontal and is spaced only a relatively small distance above the mower housing so as to render the structure quite compact and uncluttered.

A pair of outboard intermediate mower sections 25 and arranged on opposite sides of the section 10 and the sections 25 include housings 26 whose inner longitudinal edges are hingedly secured as at 27 to the longitudinal edges of the central section 10, whereby the sections 25 may be swung vertically upwardly and somewhat downwardly on the hinge axes relative to the central mower section 10. The housing sections 26 have their forward and rear edges diagonally cut, as shown. At the forward ends of the intermediate sections 25, and close to the outboard hinges 28 of the mower, supporting casters 29 are mounted on arms 30 attached to the housing sections 26. These front casters 29 prevent the sectional mower from sagging at the outboard hinges 28 and enables the complete mower to follow the contours of the ground and to cut parallel to the ground at all times. The rear ends of the intermediate mower sections 25 are additionally supported on preferably adjustable trailing wheels 31 which are also disposed near the axes of hinges 28.

The intermediate sections 25 have vertical axis rotary cutters 32 which are offset rearwardly from the central cutter 20 and are somewhat smaller in diameter than the central cutter. The vertical shafts or cutters 32 are connected with and driven by gear units 33 on housing sections 25, as shown. The gear units 33 are powered from the main gear box 21 through single telescoping drive shafts 34 having universal joints 35 and 36. As best shown in FIGURE 1, the peripheral paths of the cutters 20 and 23 overlap longitudinally so that the mower will cut a continuous swath without any uncut gaps, and at the same time there is no need for timing of the cutters because the cutter blades do not intermesh.

The mower further comprises outboard wing sections 37 including housing sections 38 connected to the housing sections 26 by the aforementioned hinges 28. The rear outer corners of mower sections 37 carry adjustable ground wheels 39, as shown. Outboard vertical axis cutters 40 are arranged beneath housing sections 38 and are offset rearwardly from the intermediate cutters 32 and are also somewhat smaller in diameter than the cutters 32. The cutting paths of cutters 32 and 40 overlap slightly so that the mower cuts a continuous swath without gaps. Again, since there is no intermeshing of the cutter blades, there is no necessity for timing the rotation of the several blades. The outboard cutters 40 are driven through gear units 41 mounted on housing sections 38 and the units 41 are powered through telescoping drive shafts 42 which in turn are connected with and driven by output shafts 43 of the gear units 33. Universal joints 44 are provided as indicated. The drive shafts 34 and 42 are substantially aligned longitudinally, as shown in FIGURE 1. The outboard mower sections 37 are capable of independent vertical swinging on the axes of hinges 28. The axes of hinges 27 and 28 are parallel.

Power means controllable from the tractor seat is provided for moving the several mower sections 25 and 37 to and from their folded positions shown in FIGURE 4. This is an important feature of the invention and allows complete control of the multi-section mower from the tractor by means of a suitable control valve and the use of the tractor hydraulic system. It is not necessary to employ cable winches or other mechanical or manual aids to fold and unfold the mower. When completely folded, FIGURE 4, the five-section mower will pass through an eight foot gateway and the structure will be sufficiently low not to exceed the maximum height allowed on most highways. When the mower is unfolded to the operative position, it will cut a swath or path approximately thirty feet wide.

The mower folding and unfolding means comprises an inner opposed pair of hydraulic cylinder-piston units 45 and 46 which extend transversely of the machine and are generally horizontal and spaced only a slight distance above the top of the mower housing. The inner ends of the units 45 and 46 are pivoted at 47 to the housing structure and the piston rods of the units are pivotally connected at 48 to sturdy brackets on the intermediate housing sections 26, somewhat laterally outwardly of the hinges 27. The units 45 and 46 are two-way hydraulic units including extended positions, FIGURE 1, and retracted positions for folding the machine, FIGURE 4. There is also a neutral or float position allowing the mower sections to rise and fall with the natural contours of the terrain. These hydraulic units are conventional and their operation is well known. All of the cylinder-piston units of the machine may be controlled from the tractor seat with conventional hydraulic valves, or a single valve of a conventional type. Since the controls may be conventional, they are omitted from the drawings for simplicity and only the essential mechanical components are illustrated. Suitable flexible hoses will extend from the cylinder-piston units of the mower to the control valve or valves on the tractor.

The folding power means further comprises a pair of outboard hydraulic extensible and retractable cylinder-piston units 49 and 50 which lie rearwardly of the units 45 and 46 and parallel thereto and laterally outwardly thereof. The inner ends of the units 49 and 50 are pivoted at 51 to sturdy lugs rigid with the housing sections 26 near the rear ends of the latter. The piston rods of units 49 and 50 are pivotally secured at 52 to the outermost housing sections 38 somewhat outwardly of the hinges 28. When the machine is in the extended operative position, FIGURES 1 and 2, all of the cylinder-piston units are generally horizontal and relatively close to the top of the mower housing.

Positive stop plates 53 and 54 are rigidly secured to the housing sections 26 and 11, respectively, adjacent the inner sides of hinges 28 and 27. The purpose of these several stop plates is to positively limit the extent of folding of the mower sections when they are disposed as in FIGURE 4. As shown in FIGURE 4, the stop plates 53 limit the swinging or folding of the outermost mower sections 37 to the inclined positions shown, and the stop plates 54 limit the folding of the intermediate mower sections 25 to the substantially vertical positions as shown in FIGURE 4. These positive stops 53 and 54 are an important feature of the invention and without them there would be no practical way to closely limit the degree of swing of the several mower sections on their hinges when being moved to the folded-up position, FIGURE 4.

When the machine is in the extended or unfolded condition, FIGURE 2, the several cylinders 45, 46, 49 and 50 are in the free-moving or neutral position and the intermediate sections 25 and wing sections 37 may rise and fall freely to conform to natural contours of the ground. When it is desired to fold the machine for travel on a highway or passage through a gateway, the tractor driver by manipulating the control valve causes retraction of the cylinder units 45, 46, 49 and 50 and the machine will automatically position itself as shown in FIGURE 4. In this position, a pair of safety links or bars 55 are temporarily employed between the center section 10 and intermediate sections 25 to prevent accidental unfolding. The operator on the tractor utilizing conventional controls may also adjust and regulate the sequence of operation of the cylinders 45, 46, 49 and 50 to cause smooth folding and unfolding of the machine.

Preliminary to folding the machine by operation of the several cylinder-piston units, it is necessary merely to disconnect the outer end of the outboard telescopic drive shaft 42 from the gear box 41 of the mower section 37 which must swing slightly more than ninety degrees in the folding operation. This is the lowermost of the sections 37 shown in FIGURE 4. To facilitate this, a quick disconnect yoke 56 of known construction is employed at the particular universal joint at the outer end of the drive shaft 42. No other preliminary steps need be taken before folding up the machine.

It is believed that the utility of the machine and its numerous features will now be readily apparent to those skilled in the art without a further description herein.

It is to be understood that the form of the invention herewith shown and described is to be taken as a preferred embodiment of the same, and that various changes in the shape, size and arrangement of parts may be resorted to, without departing from the spirit of the invention or scope of the subjoined claims.

I claim:

1. A five section tractor drawn foldable gang mower comprising a center mower section adapted for connection with a towing tractor, a pair of intermediate mower sections with one such section on each side of the center section laterally thereof and hinged to the center section on longitudinally extending hinge axes for vertical swinging movement relative to the center section, another pair of outboard wing mower sections with one such section arranged laterally outwardly of each intermediate mower section and hinged thereto on longitudinally extending hinge axes parallel to the first-named hinge axes for vertical swinging movement relative to the center and intermediate mower sections, and power means interconnecting the center and intermediate mower sections and the intermediate and outboard wing mower sections and operable to move the intermediate mower sections on the first-named hinge axes to substantially vertical upstanding positions at the opposite sides of the center section and to move the outboard wing sections on the second-named hinge axes into generally horizontal overlapping positions with both outboard wing sections disposed above the center section in superposed relation thereto and both extending laterally inwardly of the upstanding intermediate sections, whereby the overall width of the folded five section gang mower is reduced substantially to the width of the center mower section.

2. The structure of claim 1, wherein said power means is a first pair of transversely extending extensible and retractable power cylinders interconnecting said center mower section and intermediate sections, and a second pair of transversely extending extensible and retractable power cylinders interconnecting said intermediate sections and outboard wing sections.

3. The structure of claim 2, wherein said first pair of power cylinders are in end-to-end opposed relation with the interior ends of said first pair pivoted directly to the center mower section and the outer end of the first pair pivoted directly to the intermediate sections, said first pair of power cylinders lying substantially horizontally close to the tops of the center and intermediate mower sections when the latter are extended in substantially a common plane.

4. The structure of claim 1, and rigid stop elements on at least some of the mower sections near said first and second-named hinge axes to positively limit the folding motion of the intermediate and outboard wing mower sections at points where the intermediate mower sections are upstanding and the outboard wing sections are overlapping and above the center section.

References Cited

UNITED STATES PATENTS

| | | | |
|---|---|---|---|
| 2,753,674 | 7/1956 | Cunningham, et al. | 56—6 |
| 3,106,811 | 10/1963 | Heth et al. | 56—7 |
| 3,115,736 | 12/1963 | Engler | 56—6 |
| 3,121,987 | 2/1964 | Harris | 172—316 X |
| 3,400,521 | 9/1968 | Caldwell | 56—6 |

LOUIS G. MANCENE, Primary Examiner

P. A. RAZZANO, Assistant Examiner